I. A. MANN, DEC'D.
M. P. MANN, EXECUTRIX.
PIPE CONNECTION.
APPLICATION FILED JULY 8, 1916.
1,277,977.
Patented Sept. 3, 1918.
2 SHEETS—SHEET 1.
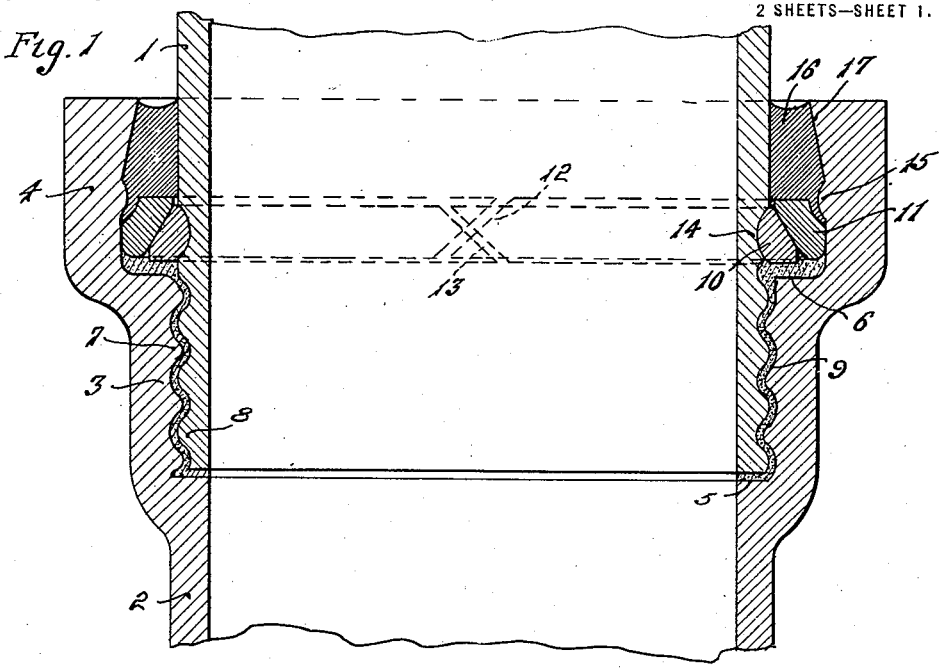
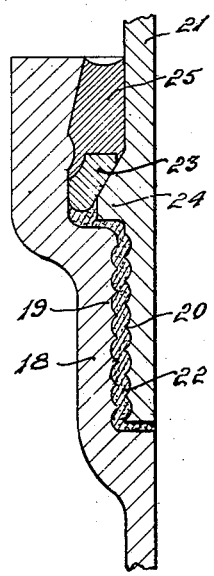
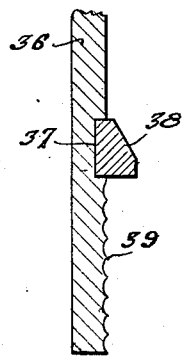
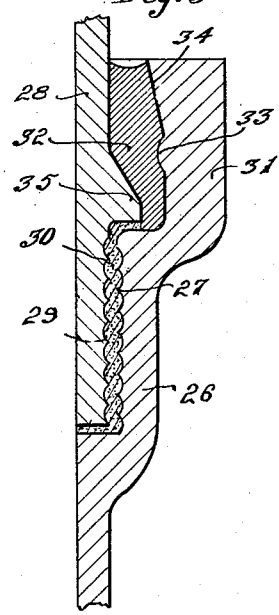
WITNESS:
INVENTOR.
ATTORNEYS.

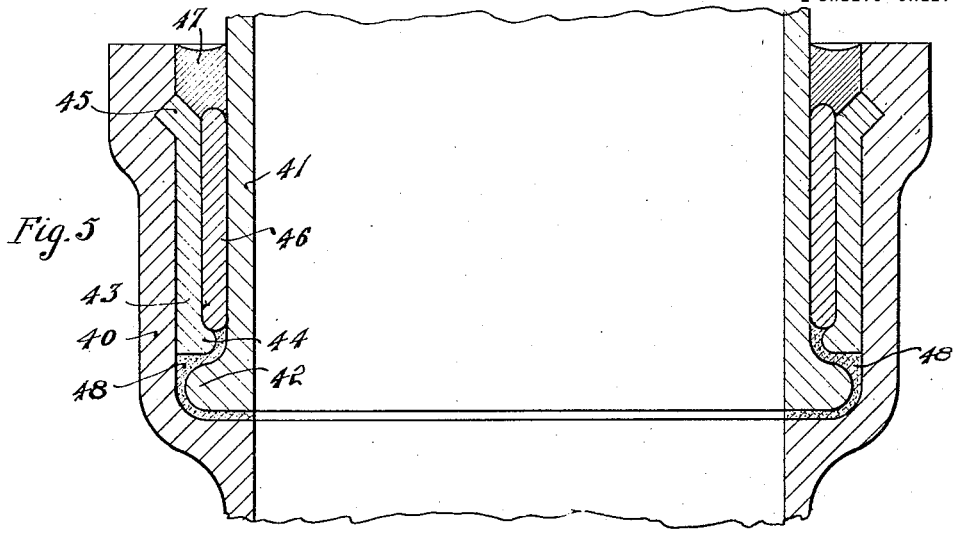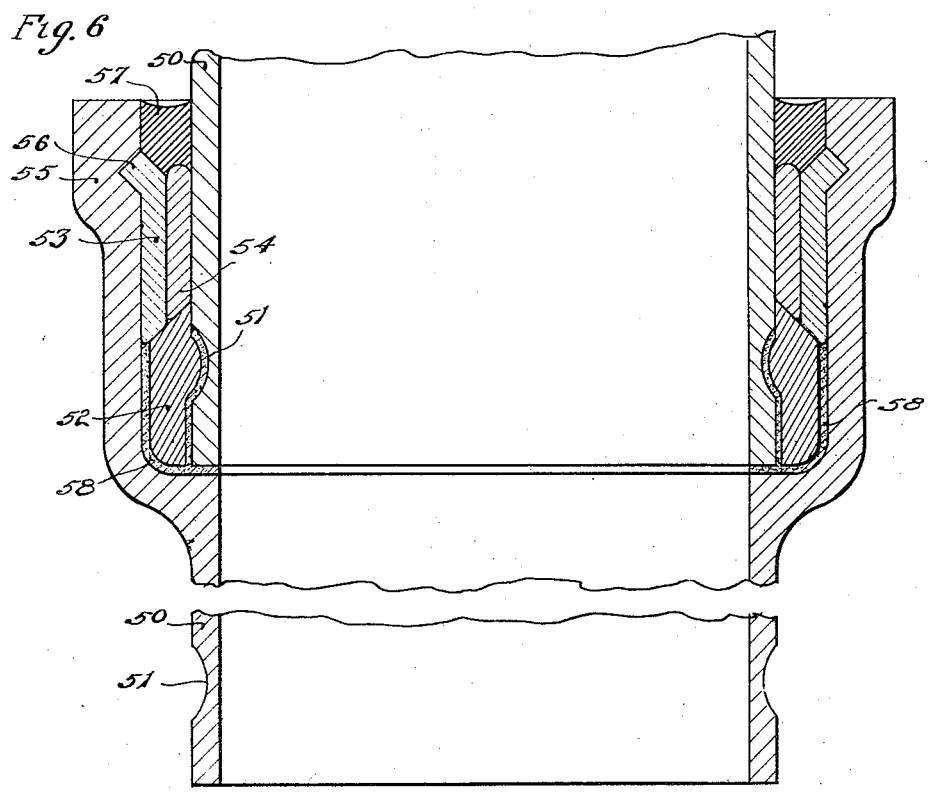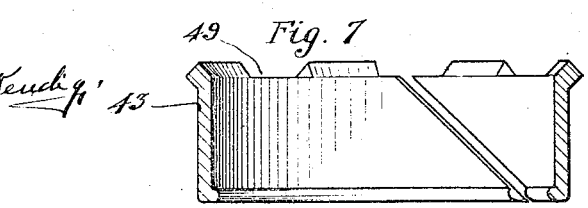

UNITED STATES PATENT OFFICE.

IRA A. MANN, OF PITTSBURGH, PENNSYLVANIA; MARION P. MANN EXECUTRIX OF SAID IRA A. MANN, DECEASED.

PIPE CONNECTION.

1,277,977.

Specification of Letters Patent.

Patented Sept. 3, 1918.

Application filed July 8, 1916. Serial No. 108,089.

*To all whom it may concern:*

Be it known that I, IRA A. MANN, a citizen of the United States, residing at Pittsburgh, in the county of Allegheny and State of Pennsylvania, have invented certain new and useful Improvements in Pipe Connections, of which the following is a specification.

The invention relates to pipe connections and particularly to pipe connections for use with cast iron pipe, although useful in other relations. It has for its primary objects; the provision of a joint which is cheaply constructed and readily applied; and the provision of a joint of great strength with the sections of pipe securely held against longitudinal separation and against lateral bending or buckling at the joints. Certain embodiments of the invention are illustrated in the accompanying drawings, wherein—

Figure 1 is a section through one form of connection; Figs. 2 and 3 are sections through modifications; Fig. 4 is a section through a portion of a modified form of pipe end; Figs. 5 and 6 are sections through other modifications; and Fig. 7 is a section through one of the wedging rings used in the construction of Fig. 5.

Referring to the construction of Fig. 1, reference numerals 1 and 2 designate the ends of cast iron pipes to which my improvement is applied, the pipe 2 being provided with a hub having portions 3 and 4 of different diameters and being provided with the shoulders 5 and 6.

The portion 3 of the hub of less diameter is provided with the cast screw threads 7, and the end of the pipe 1 is similarly provided with screw threads 8 so that the pipe 1 may be screwed into position. The screw connection is a relatively loose one so that when the parts are positioned a space is provided for a holding cement. This space is filled with the semi-fluid or plastic layer of cement 9, which hardens and forms both a holding and locking means and a seal. The cement preferably extends over both shoulders 5 and 6, as illustrated.

Above the cement, and lying in the hub portion 4 of larger diameter, are the wedged locking rings 10 and 11 of relatively hard metal, such rings being split, as indicated at 12 and 13, so that they may be readily applied in position. As illustrated, the pipe 1 is preferably recessed at 14 to receive the side of the ring 10 and afford a secure grip by the ring upon the pipe, and a projection 15 is provided upon the inner surface of the hub portion 4 for preventing the upward movement of the locking ring 11.

Above the locking rings 10 and 11 is a packing and sealing material 16 of relatively soft metal, such as lead, which is poured and tamped into position. This metal seal 16 serves to hold the locking rings 10 and 11 securely in position, the projection 15 and the inwardly inclined surface 17 on the hub assisting in the performance of this function.

The foregoing construction provides a joint of great strength. The threaded connection with the holding cement securely maintains the pipe sections against separation in a longitudinal direction, and this holding connection is further reinforced by the metal locking rings 10 and 11 and the lead seal 16. The joint is also of such length that lateral bending or buckling is prevented. The cement 9 not only performs the function of making the pipe more secure against longitudinal separation, but also acts as a seal for the metallic packing 16 and prevents such packing from running down into the interior of the pipes. The construction can be formed by casting so that it is relatively cheap in cost and the cement and locking means can be very easily and conveniently applied to give a joint which is substantially permanent.

Fig. 2 illustrates a modification wherein the portion 18 of the hub of least diameter is provided with a roughened or corrugated surface 19 which opposes a similarly roughened or corrugated surface 20 on the lower end of the pipe 21. Cement 22 is applied as in the other form of construction and above this cement is a single wedging ring 23 of relatively hard material which engages a ring 24 integral with the pipe 21. Above the locking ring 23 is a metallic seal 25 as in the other type of construction.

Fig. 3 illustrates a type of connection which is simpler and more readily applied than either of the constructions of Fig. 1 and Fig. 2. In this construction the portion of the hub 26 of least diameter is roughened or corrugated, as indicated at 27, just as in the construction of Fig. 2, and the lower end of the pipe 28 is similarly corrugated at 29 and a holding cement 30 provided between the two roughened surfaces. In this construction no locking ring of hard metal is used, the portion 31 of the hub of larger diameter being filled with a metallic seal 32. The hub is provided with a holding ring 33 and inclined surface 34, while the pipe 28 is provided with a projecting ring 35, so that in order to pull the pipes apart longitudinally, the lead seal 32 would have to be sheared throughout its length. The layer of cement 30 coöperating with the roughened surfaces 27 and 29 also acts powerfully to prevent relative longitudinal movement of the two pipe sections.

Fig. 4 illustrates a modification of Fig. 3, wherein the pipe end 36 instead of being provided with a projecting ring corresponding to the ring 35 in Fig. 3, is grooved, as indicated at 37, and carries a separate ring 38. Below this ring is a roughened or corrugated surface 39 corresponding to the roughened surface 29 of Fig. 3. This pipe end is used in connection with a hub similar to that of Fig. 3. This type of construction is used in those cases in which it is necessary to cut a pipe, so that it becomes necessary to provide the pipe thus cut with an end corresponding to that of Fig. 3. This can be readily done on the job or at the shop by machining the groove 37 in the end of the pipe, and also providing the roughened surface 39 by machining. The invention thus becomes applicable to pipes which are specially cut as well as to those which are originally cast in the form indicated in Figs. 2 and 3.

It will be apparent from the foregoing that the invention is capable of embodiments in a considerable variety of forms, four of which are illustrated. Wedging rings of relatively hard metal may or may not be used, and when used these wedging rings may be widely varying in form. The invention also contemplates the roughening of the opposing surfaces of the portion of the hub of less diameter and the pipe end in a variety of ways, and the term "roughening" is used in its broad sense to cover screw threads, such as those indicated in Fig. 1, or the provision of any sort of irregularities in the opposing surfaces, such as will permit of a holding connection upon the cement, making it necessary for the cement to be sheared in order to separate the pipe sections.

In the construction of Fig. 5 a standard pipe hub 40 is used into which fits the pipe end 41 provided at its end with the bead 42. Between the pipe and the hub is the split wedge ring 43 of hard metal which has an inturned bead 44 at its lower edge lying above the bead 42. The upper edge of the ring is turned outwardly as indicated at 45 and fits into the groove provided on the inner surface of the hub. A second wedge ring 46 is provided inside the wedge ring 43, and a lead packing 47 fills the space above the two wedge rings. A filling cement 48 is provided around the lower end of the pipe. In order that the lead 47 may be held against outward movement the slots 49 (Fig. 7) are provided in the upper edge of the ring 43, these slots permitting the lead to engage the groove on the inner wall of the hub.

Fig. 6 illustrates a modification of the structure of Fig. 5 which may be employed when the pipe 50 has to be cut to a special length and so does not have the bead of the construction of Fig. 5. Under these conditions the groove 51 is cut near the end of the pipe and the lower wedge ring 52 has a projection fitting into this groove. Two other wedge rings 53 and 54 are employed in the hub 55 and lying above the ring 52. The wall of the hub is grooved to receive the upper end 56 of the wedge ring 53 and a metallic packing 57 is provided above the rings 54 and 56. A layer of hard cement 58 is employed at the lower end of the pipe 50 and around the lower wedge ring.

What I claim is:

1. In combination in a pipe joint, a hub, a pipe fitting therein and provided with an annular rib rigid therewith, hard metal locking means coöperating with the inner wall of the hub and said rib and preventing the outward movement of the pipe end, and a soft metal packing outward from the locking means for holding such means in position and sealing the joint.

2. In combination in a pipe joint, a hub, a pipe fitting therein and provided with an integral annular rib, hard wedging means between the inner wall of the hub and the rib, and a soft metal packing means for holding the wedging means in position.

3. In combination in a pipe joint, a hub, a pipe fitting therein and provided with an integral annular rib at a point remote from the end of the pipe, hard metal wedging means between the rib and the inner wall of the hub, and soft metal packing outward of the wedging means.

4. In combination in a pipe joint, a hub provided with a shoulder, a pipe fitting therein and provided with a rigid annular rib, hard metal wedging means lying intermediate said shoulder and said rib, and metallic packing means outward of the wedging means.

5. In combination in a pipe joint, a hub of two diameters with the inner portion of less diameter and having a shoulder in the portion of greater diameter, a pipe fitting in the hub provided adjacent the portion of the hub of least diameter with a rigid annular rib, a locking means lying intermediate the rib and said shoulder in the hub, and a soft metal packing outward of the locking means.

6. In combination in a pipe joint, a hub of two diameters with the inner portion of less diameter, a pipe fitting in the hub and provided adjacent the end of the portion of the hub of least diameter with an annular rib rigid with the pipe, cement between the inner end of the pipe and the portion of the hub of less diameter, a hard metal wedging means between the rib and the wall of the hub of greater diameter, and a metal packing outward of the wedging means.

7. In combination in a pipe joint, a hub, a pipe fitting therein and provided with an annular rib rigid with the pipe at a point remote from the end of the pipe, hard metal wedging means between the rib and the inner wall of the hub, and soft metal packing outward of the wedging means, the inner wall of the hub outward of the wedging means being inclined to prevent the outward movement of the packing and the wedging means.

IRA A. MANN.